United States Patent
Tanner et al.

[15] 3,702,932
[45] Nov. 14, 1972

[54] MELTING CRYOGEN COOLING FOR RADIATION LOGGING PROBE

[72] Inventors: Allan B. Tanner, Washington, D.C.; Frank E. Senftle, Chevy Chase, Md.; Robert M. Moxham, Alexandria, Va.

[73] Assignee: The United States of America as represented by the United States Atomic Energy Commission

[22] Filed: April 15, 1971

[21] Appl. No.: 134,283

[52] U.S. Cl................250/83.3 R, 62/384, 62/514, 250/83.6 W
[51] Int. Cl..............................................H01j 39/00
[58] Field of Search...250/83.6 W, 83.3; 62/439, 514

[56] References Cited

UNITED STATES PATENTS

| 3,545,226 | 12/1970 | Caren | 62/514 |
| 2,711,084 | 6/1955 | Bergan | 62/384 |
| 3,360,943 | 1/1968 | Schoenfeld | 62/384 |
| 3,496,360 | 2/1970 | Dewan | 250/83.6 W |
| 3,611,746 | 10/1971 | Marsing | 62/514 |
| 3,253,423 | 5/1966 | Sonnabend | 62/514 |

OTHER PUBLICATIONS

Well Logging With Californium–252, by Keys Soc. of Professional Well Logging Analysts May 25, 1969.

Primary Examiner—Archie R. Borchelt
Assistant Examiner—D. C. Nelms
Attorney—Roland A. Anderson

[57] ABSTRACT

A borehole logging probe for mineral or petroleum exploration is disclosed having a californium-252 neutron source for activating elements adjacent to the borehole and a solid state detector for sensing resulting radiation. The probe includes an elongated watertight housing having a shielded compartment for the neutron source, and a thermally insulated compartment for containing the radiation detector. A reservoir is filled with a fusible solid cryogen and located within the insulated compartment adjacent to the detector with a thermal conduction member disposed to cool the radiation detector by transferring heat to the solid cryogen.

2 Claims, 2 Drawing Figures

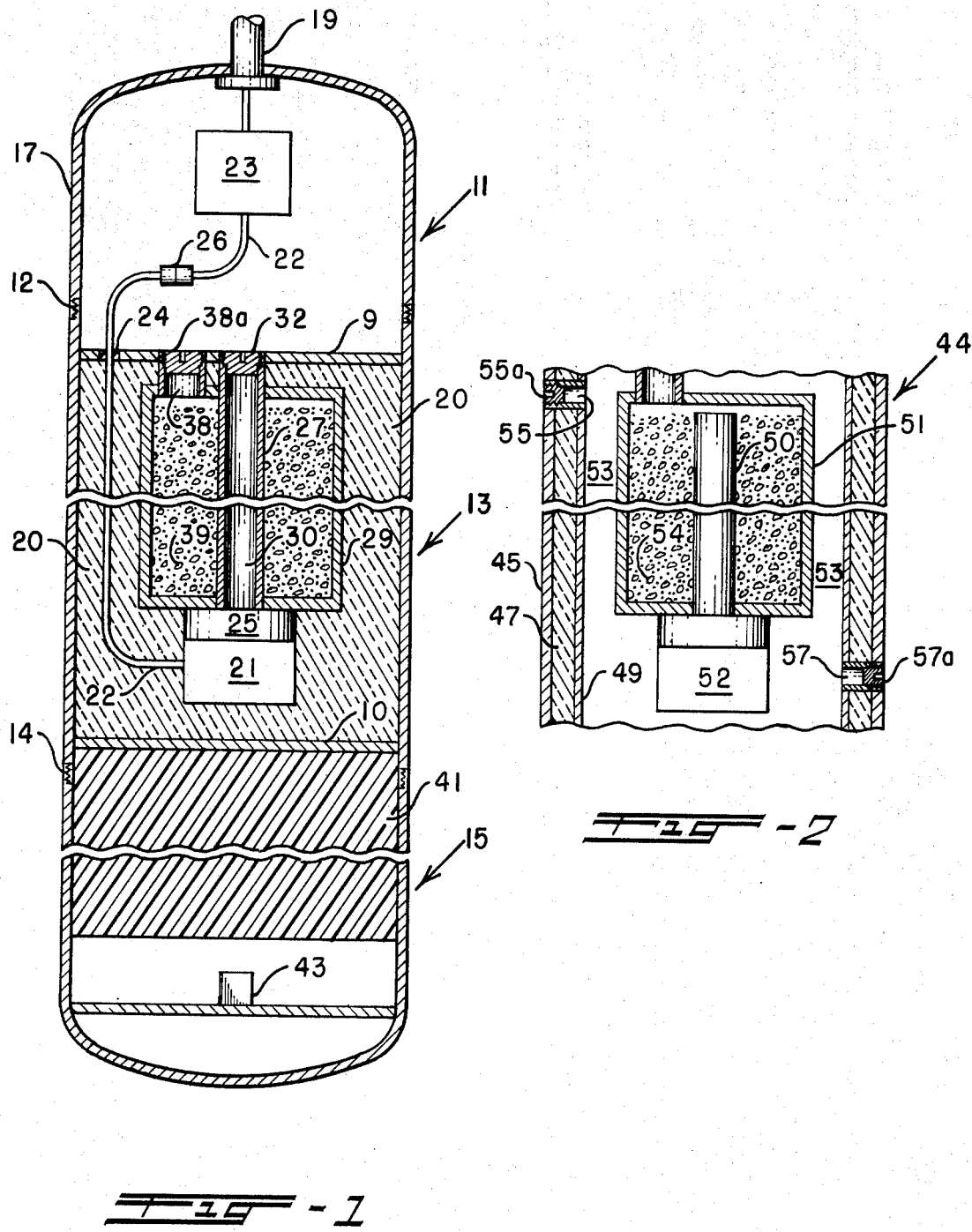

MELTING CRYOGEN COOLING FOR RADIATION LOGGING PROBE

BACKGROUND OF INVENTION

The invention described herein was made in the course of a contract with the U.S. Atomic Energy Commission.

1. Field of the Invention

This invention relates to a logging probe having a californium-252 neutron source and an improved cooling means for use with a radiation detector.

Radiation logging with a source of neutrons or other type radiation is used for detecting underseas minerals and surveying of trial boreholes to locate petroleum or mineral deposits. Useful data can be obtained from the attenuation of reflected radiation flux, activation analysis of elements within sought minerals and the analysis of prompt gamma radiation emitted from elements on capturing a neutron or nuclear particle. In this latter analysis a high resolution radiation detector is required to identify the elements by their prompt gamma signatures, i.e., the energy and pulse height distribution of the prompt gamma radiation. One such detector is a lithium drifted germanium semiconductor that must be maintained at a low temperature in order to operate satisfactorily.

2. Description of Prior Art

Prior logging devices which require cooling have employed liquid nitrogen or other liquid refrigerants. For instance see "Mineral Exploration of the Ocean Floor by In Situ Neutron Absorption Using a Californium-252 ($^{252}$Cf) Source," Marine Technology Society Journal Sept.-Oct. 1969, Vol. 3, No. 5 and U.S. Pat. application, Ser. No. 40,644 filed May 26, 1970. Use of liquid refrigerants require that means be provided to vent the refrigerant vapors produced by vaporization of the liquid and to control the temperature and pressure of the liquid refrigerant.

Further problems arise from adverse borehole conditions such as high temperatures or pressures and the presence of mud or other substances that may interfere with the operation of the probe. Foreign matter can enter venting or pressure regulating devices to plug, stick or otherwise cause a malfunction. In addition, in liquid or water filed boreholes, the boiling temperature and consequently the cooling temperature of the liquid refrigerant is dependent on the hydrostatic pressure at the depth where the probe is employed. Variations, in the refrigerant temperatures by as little as 10° to 15° C can cause instrument drift, increased noise and a loss of resolution in a lithium drifted germanium radiation detector.

SUMMARY OF INVENTION

It is therefore an object of the present invention to provide a logging probe for mineral or petroleum detection that is substantially unaffected by adverse borehole conditions.

It is a further object to provide a logging probe having a californium-252 neutron source and a high resolution radiation detector provided with a coolant maintained at substantially a constant temperature regardless of the depth at which the probe is employed beneath a liquid surface.

It is also an object to provide an improved method of cooling a radiation detector employed within a logging probe.

In accordance with the present invention there is provided a logging probe for mineral or petroleum detection having a californium-252 neutron source, and a high resolution radiation detector shielded from the neutron source. A reservoir for containing a solid cryogen is disposed adjacent to the radiation detector with a thermal conduction member extending between the reservoir and the detector. A passageway or conduit for containing a liquid refrigerant is disposed adjacent to the detector and the reservoir.

The radiation detector is cooled by disposing a solid cryogenic material into the reservoir adjacent to the detector to contact the thermal conduction member and remove heat from the detector as the solid cryogen melts. During storage or while the probe is not in use, a liquid refrigerant is admitted into the conduit to freeze and preserve the cryogen in solid form.

DESCRIPTION OF THE DRAWINGS

The present invention is illustrated in the accompanying drawings wherein;

FIG. 1 is an elevation view in cross section of a logging probe with various components diagrammatically shown.

FIG. 2 is a fragmentary view of an alternate embodiment of the probe shown in FIG. 1.

DETAILED DESCRIPTION OF THE PREFERRED EMBODIMENT

Referring to FIG. 1, a logging probe is shown having an electronic section 11, a cryogenic section 13 and a radiation source section 15. All three sections are enclosed within an elongated water proof housing 17 fabricated of a suitable material such as zirconium or a zirconium alloy that emits a minimum of interferring radiation on neutron absorption. A cable 19 is connected to the top portion of housing 17 for raising and lowering the probe into a borehole or other location for use. Cable 19 is of a known type incorporating electrical leads for operation of the probe.

Cryogenic section 13 is defined within housing 17 by partitions 9 and 10 separating it from the electronics section 11 and radiation source section 15, respectively. Threaded or other suitable fittings 12 and 14 allow removal of the cryogenic section 13 from the remainder of the probe. A layer of thermal insulation material 20 lines the inside of housing 17 and partitions 9 and 10 to substantially encompass the cryogenic section. Insulation 20 may be composed of spaced apart corrugated aluminum sheets with layers of trapped air or vacuum with sealed surfaces to prevent penetration of moisture or other substances.

The inner volume of cryogenics section 13 includes a high resolution solid state radiation detector 21 such as a lithium drifted germanium semiconductor. This detector senses radiation resulting from neutron activation of elements in the vicinity of the bore hole. Other radiation detectors such as lithium drifted silicon semiconductors or cadmium telluride semiconductors might also be employed depending on the energy range to be detected and energy resolution required. Detector 21 is electrically connected to the electronic section 11 by electrical cable 22 that is routed through a passageway within insulation 20 and a sealing grommet 24 through partition 9. A suitable electrical connector 26 is provided in electrical conductor 22 to permit a complete separation of electronic section 11 from cryogenic section 13.

A cryogenic reservoir 29 for containing a solid cryogenic material 39 is shown disposed above detector 21. An elongated conduit or thermal conduction member 27 extends through and sealingly penetrates both ends of reservoir 29 as well as partition 9. The internal passageway 30 within member 27 is closed at one end with a removable plug 32. The opposite end of member 27 is covered with an end plate 25 disposed outside the bottom of reservoir 29. End plate 25 is mechanically bonded to radiation detector 21 to allow heat transfer from the detector to the cryogenic material 39 contacting member 27. A port 38 is provided at the top of reservoir 29 through partition 9 for filling the reservoir with the cryogenic material. Removable plug 38a is installed in port 38 during use of the probe.

Cryogen material 39 within reservoir 29 melts at a sufficiently low temperature to maintain the radiation detector at about −150° C to −200° C. Ideally a lithium drifted germanium radiation detector should be operated at or below about −180° C. However, some detector crystals have been found to exhibit low leakage at considerably higher temperatures to permit a wider choice of cryogens. The following table lists various cryogens having melting and boiling points within or near a usable range.

TABLE I

|  | M.P. (°C) | B.P. (°C) at 1 atm. |
|---|---|---|
| Propane | −187.69 | −44.5 |
| Propene | −185.2 | −47.8 |
| Carbon tetrafluoride | −184 | −128 |
| Ethane | −182.8 | −88.63 |
| Methane | −182.48 | −161.49 |
| Chlorotrifluoromethane (R−13) | −181 | −81.4 |
| Ethene | −169.15 | −104 |
| Nitric oxide | −163.6 | −151.8 |
| Fluorine dioxide | −163.5 | −57 |
| Trifluoromethane | −163 | −82.2 |
| Trimethyl borine | −161.5 | −20 |
| Chlorodifluoromethane (R−22) | −160 | 40.75 |
| Chloroethene | −160 | −13.9 |
| 2-methylbutane | −160 | +27.9 |
| 1-fluoropropane | −159 | −2.5 |
| Dichlorodifluoromethane (R−12) | −158 | −27.79 |
| Methylsilicane | −156.4 | +31 |
| Tetraethyllead | −136.80 | +200 (decomposes) |

Other desirable features for the cryogenic material include a high liquid and solid density as well as a large latent heat of fusion to permit absorption of a large quantity of heat into a small volume of cryogen. For safety the cryogen should have a critical temperature above any ambient temperature to which the probe might be accidentally warmed. Several cryogens from Table I are favorably viewed in light of these desiderata and are listed in Table II.

TABLE II

|  | Propane | R-13* | R-22* | R-12* |
|---|---|---|---|---|
| Melting point (°C) | −187.69 | −181 | −160 | −158 |
| Critical temp. (°C) | 96.81 | 28.9 | 96.0 | 112.0 |
| Liquid density near M.P. (g/cm³) | 0.71 | 1.73 | 1.63 | 1.73 |
| Solid density at M.P. (g/cm³) | 0.75 | 2.02 | 1.52 | 1.88 |
| Heat of fusion (cal/mol) | 842.2 | 980 | 985.5 | 990 |
| Heat of fusion/unit Volume (cal/cm³) | 14.6 | 18.9 | 17.3 | 16.6 |

*See Table I for chemical identification.

Except for R-13 (chlorotrifluoromethane), the cryogens in Table II have sufficiently high critical temperatures to permit normal use without pressure relief elements. All have suitably low melting points but the detectors used with R–22 and R–12 will be selected for extremely low leakage current at their melting points.

The electronics section 11 includes an appropriate power supply and amplifier represented diagrammatically at 23 to relay signals from radiation detector 21 to data processing and readout equipment at the surface via cable 19. This section is generally not refrigerated and is isolated from the cryogenic section 13 by the layer of thermal insulation 20. If necessary or desirable, some of the electronic components could be located near or within cryogenic section 13 for cooling.

The radiation source section 15 is shown with a shielding material 41 disposed above a neutron radiation source 43 to shield the electronic section 11 and cryogenic section 13 from direct irradiation. The source 43 can be an encapsulated quantity of californium-252 or some other suitable, small size radiation source. Californium-252 undergoes spontaneous fission to produce a higher sustained neutron yield for a given source size than other known neutron sources. Shielding material 41 can be a suitable hydrogenous material such as polyethylene or compressed wood fibers.

In practicing the present invention, the probe is disassembled at fittings 12 and 14 and the cryogenic material 39 in liquid form is filled into reservoir 29 through port 38. A small vapor space is left unfilled at the top of reservoir 29 to allow for expansion of the cryogen. Plug 38a is then installed to seal the cryogenic reservoir. Plug 32 is removed from member 27 and liquid nitrogen at about −196° C is admitted into passageway 30 to freeze the cryogenic material to solid form.

One manner of supplying liquid nitrogen into passageway 30 is by supporting an inverted container of liquid nitrogen having a spout tube over the disassembled cryogenic section 13. The spout is loosely inserted part way down passageway 30. Liquid nitrogen fills into the passageway until the end of the spout is covered thereby blocking air flow into the container and liquid nitrogen into the passageway. As the liquid nitrogen boils off, freezing the cryogenic material, more liquid nitrogen is supplied in "chicken feeder" fashion to maintain a liquid level at the end of the spout.

Referring now to FIG. 2 where an alternate cryogenic section 44 is illustrated. A layer of thermal insulation material 47 is disposed between an outer housing 45 and a sealed liner 49 to limit heat transfer into the cryogenic section 44. A cryogenic reservoir 51 is spaced from liner 49 to define an annular passageway 53. Porous or perforated supports (not shown), as are ordinarily used in liquid nitrogen Dewar flasks, can be employed to maintain the spacing of the liner 49 and reservoir 51. A thermal conduction member 50 sealingly penetrates one end of reservoir 51 to transfer heat from a radiation detector 52 to a solid cryogenic material 54 contained in the reservoir. Ports 55 and 57 are provided through housing 45, insulation 47 and liner 49 at opposite end portions of cryogen section 44. Plugs 55a and 57a seal the corresponding ports during use of the probe. These plugs are removed and liquid nitrogen or other suitable refrigerant circulated from port 57 through annular passageway 53 and out port 55 to freeze cryogenic material 54 within reservoir 51. Passageway 53 is then emptied or evacuated and plugs 55a and 57a installed to prepare the probe for further use.

Other methods for freezing the cryogenic material include thermoelectric cooling and small closed cycle refrigerators. By employing the solid cryogen within the probe to stabilize the temperature during downhole use, these other refrigeration methods could be confined to use at the surface to refreeze the cryogenic material. Thus the problems associated with power losses, high-power transmission downhole and mechanical vibration of the probe during use could be avoided.

During employment of the probe of FIG. 1 or 2 in a liquid filled borehole or other application, the cryogenic material melts at substantially a constant temperature regardless of the hydrostatic pressure exerted as the probe is lowered to various depths. Heat is transferred from the thermal conduction member to the melting cryogen. The radiation detector is thereby maintained at a constant temperature through contact with the thermal conduction member plate. The temperature of the radiation detector will remain constant until substantially all of the cryogenic material has melted. For a probe with a 50 cc lithium drifted germanium radiation detector supplied with about 75 grams of solid propane, the temperature will remain at about −188° C for about 10 hours. After use and while in storage the probe can be reconnected to a liquid nitrogen supply to refreeze the cryogenic material for subsequent service.

The present invention provides a logging probe that may be used for mineral or petroleum detection while continuing to maintain its radiation detector at a constant cold temperature under adverse borehole conditions including varying temperature and hydrostatic pressure. No external vapor venting devices and pressure regulating valves are required for normal downhole use of the probe, thereby reducing the risk of malfunction caused by foreign substances entering the probe components from the borehole. The solid cryogen melts at a constant temperature and incurs only a minor volume change over the phase transition to make it especially suitable for cooling a radiation detector in a small volume logging probe.

What is claimed is:

1. An improved neutron logging probe disposed within a sealed housing, comprising:
    a. a Cf–252 neutron source for establishing neutron flux in the vicinity of said probe;
    b. a lithium drifted germanium radiation detector for sensing radiation produced by the interaction of said neutron flux with substances outside said housing;
    c. a sealed reservoir disposed adjacent to said detector;
    d. solid cryogen material selected from the group consisting of propane, chlorodifluoromethane and dichlorodifluoromethane disposed in said reservoir; and
    e. a straight tubular thermal conduction member longitudinally disposed through said reservoir in thermal communication with said solid cryogen material and sealingly penetrating both ends of said reservoir, said thermal conduction member being closed at one end with an end plate disposed in thermal communication with said radiation detector and at the opposite end with a removable plug member for admitting a liquid refrigerant.

2. In a neutron logging probe, including a Cf–252 radiation source and a lithium drifted germanium radiation detector, the improved method of cooling said detector comprising:
    a. disposing a solid cryogenic material selected from the group consisting of propane, chlorodifluoromethane and dichlorodifluoromethane within a sealed reservoir adjacent to said detector;
    b. thermally coupling said detector to said solid cryogenic material with a straight tubular thermal conduction member having a removable plug at the end opposite said detector;
    c. allowing said solid cryogenic material to melt and absorb heat from said detector through said thermal conduction member; and
    d. refreezing said cryogenic material by removing said plug; inserting an open spout of an otherwise closed container of liquid nitrogen part way down said tubular member and gravitating liquid nitrogen into said tubular member from said container.

* * * * *